United States Patent
Mogamiya et al.

(10) Patent No.: US 7,154,074 B2
(45) Date of Patent: Dec. 26, 2006

(54) TELESCOPE MAIN BODY AND SPOTTING SCOPE

(75) Inventors: Makoto Mogamiya, Tokyo (JP); Toshio Masuda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 194 days.

(21) Appl. No.: 10/981,788

(22) Filed: Nov. 5, 2004

(65) Prior Publication Data

US 2005/0099684 A1   May 12, 2005

(30) Foreign Application Priority Data

Nov. 6, 2003   (JP)   ............................. 2003-377604

(51) Int. Cl.
  *H04N 5/232*   (2006.01)
(52) U.S. Cl. .................................... 250/201.2; 348/345
(58) Field of Classification Search ............. 250/201.2; 396/298, 382; 359/426, 429, 399, 407; 348/333.01, 348/345
  See application file for complete search history.

(56) References Cited

U.S. PATENT DOCUMENTS

| 5,491,588 | A | 2/1996 | Ogawa et al. |
| 5,504,624 | A | 4/1996 | Kato |
| 5,581,399 | A | 12/1996 | Abe |
| 5,774,746 | A | 6/1998 | Kirigaya et al. |
| 6,914,624 | B1 * | 7/2005 | Esquibel et al. ......... 348/207.99 |

FOREIGN PATENT DOCUMENTS

JP    3074642    10/2000

OTHER PUBLICATIONS

T. Ogura, "Fundamentals and Developments of Photographic Lenses", pp. 62-67, together with an English language translation of the same.
M.R. Tomkins, "Kowa Announces Super-Telephoto Zoom Digicam", downloaded from http://www.imaging-resource.com/NEWS/1047935077.html on Oct. 22, 2004.
U.S. Appl. No. 10/981,785 to Mogamiya et al., filed Nov. 5, 2004.
U.S. Appl. No. 10/981,780 to Mogamiya et al., filed Nov. 5, 2004.
U.S. Appl. No. 10/981,796 to Mogamiya et al., filed Nov. 5, 2004.
U.S. Appl. No. 10/981,784 to Mogamiya, filed Nov. 5, 2004.

* cited by examiner

*Primary Examiner*—Thanh X. Luu
*Assistant Examiner*—Tony Ko
(74) *Attorney, Agent, or Firm*—Greenblum & Bernstein, P.L.C.

(57) ABSTRACT

A telescope main body, which is provided with an objective optical system, a focusing system, an imaging device, a beam splitter, and a correcting system that performs a correcting operation for correcting a position shift between an image forming position of an object image and a receiving surface of the imaging device caused by diopter variation of a user. The correcting system includes a focus driving system which relatively moves an image forming position of the object image with respect to the receiving surface, a focus detecting system which detects a status in which the image forming position coincides with the receiving surface, and a controller controlling the focus driving system. The controller has with a learning function of storing correction data of a preceding correcting operation so that the stored correction data of the preceding correcting operation is reflected in a subsequent correction operation.

18 Claims, 12 Drawing Sheets

TELESCOPE MAIN BODY AND SPOTTING SCOPE

BACKGROUND OF THE INVENTION

The present invention relates to a telescope main body and a spotting scope.

A telescope (spotting scope) with a digital camera is known, which is capable of shooting an electronic image that is the same as a visual image viewed through an eyepiece thereof. Such a telescope is disclosed, for example, in a Japanese Utility Model Publication No. 3074642 (hereafter, referred to as a document 1). The telescope with a digital camera is provided with a beam splitter for splitting a light beam that has passed through an objective optical system and a focusing lens, and leading one of the resultant split beams to an ocular optical system and the other to an imaging device such as a CCD (charge coupled device) imaging device.

Such telescope with digital camera may incur a focal shift between a visual image viewed through the eyepiece and an object image captured by the imaging device, because of diopter variation of a user, such as hyperopia or myopia. In other words, though the image viewed through the eyepiece appears correctly focused, the image captured by the imaging device may not be correctly focused.

In order to eliminate such focal shift, a fieldscope with a DV camera disclosed in the patented document 1 is provided with a diopter adjusting ring located close to an ocular lens, to be manipulated for moving the ocular lens group such that a scale (shooting frame) marked on a focusing glass becomes clearly seen, to thereby correct a user's diopter variation, which is a variation among individuals (see paragraph 0034 of the document 1).

However, the fieldscope with a DV camera according to the document 1 still has a drawback that the manipulation of the diopter adjustment is troublesome, and the fieldscope is therefore not user-friendly. Besides, since the visual image viewed through the eyepiece can any way be focused upon manipulating a focusing ring regardless of whether the diopter adjustment is performed or not, the troublesome diopter adjustment operation is prone to be skipped or forgotten, which may result in producing a blurred picture with a focal shift.

Further, even though the diopter adjustment has been performed, the adjustment may still be unsharp (inaccurate) depending on focusing capability of the user's eye. In this case, also the shot image suffers a focal shift.

Furthermore, even though the diopter adjustment has been correctly performed at first, the user's diopter may vary with time owing to eye strain, instrument myopia or a change of a condition of use, therefore subsequent shots may result in blurred pictures.

SUMMARY OF THE INVENTION

The present invention is advantageous in that it provides a telescope main body and a spotting scope, capable of correcting without fail a focal shift caused by diopter variation of a user, between a visual image viewed through an ocular optical system and an object image captured by an imaging device.

According to an aspect of the invention, there is provided a telescope main body, which is provided with a an objective optical system, a focusing system including a focus adjusting member to be manipulated for focusing and a focusing lens which moves along a direction of an optical axis by operation of the focus adjusting member, an imaging device which captures an object image formed through the objective optical system and the focusing lens, and a beam splitter which splits an optical path through the focusing lens into a first optical path directed to the imaging device and a second optical path directed to a user's eye.

Further, the telescope main body is provided with a correcting system that performs a correcting operation for correcting a position shift between an image forming position of the object image and a receiving surface of the imaging device caused by diopter variation of a user. The correcting system includes a focus driving system which relatively moves the image forming position of the object image with respect to the receiving surface in the direction of the optical axis, a focus detecting system which detects a status in which the image forming position of the object image coincides with the receiving surface, and a controller which controls the focus driving system. The controller is provided with a learning function of storing correction data of a preceding correcting operation so that the stored correction data of the preceding correcting operation is reflected in a subsequent correction operation.

With this configuration, a focal shift caused by diopter variation of a user, between a visual image viewed through an ocular optical system and the object image captured by the imaging device, is corrected reliably. Even if the diopter of the user changes due to, for example, eye strain, instrument myopia or a condition of use of the telescope body (e.g., an illumination condition), the focal shift can be corrected by the learning function.

Optionally, the telescope main body may include an ocular optical system located along the second optical path. In this case, the correcting system may perform a calibrating operation of detecting a calibration point where the image forming position of the object image coincides with the receiving surface when a user has achieved focusing of a visual image viewed through the ocular optical system by manipulating the focusing ring.

In a particular case, the ocular optical system may be provided in an eyepiece which is fixed to the telescope main body.

In a particular case, the ocular optical system may be provided in an eyepiece which is detachably attached to the telescope main body.

Still optionally, the calibrating operation may be performed at a start of use of the telescope main body.

Still optionally, a driving range of the focus driving system when the focus detecting system detects a focus in the correcting operation may include a region on both sides of the calibration point.

Still optionally, a driving range of the focus driving system when the focus detecting system detects a focus in the correcting operation may be smaller than a driving range of the focus driving system when the focus detecting system detects a focus in the calibrating operation.

Still optionally, the controller may update the calibration point based on the correction data obtained through the learning function.

Still optionally, the correction data may include a driving direction of the focus driving system in the correcting operation. When the driving direction of the focus driving system in the correcting operation has been the same over a predetermined number of times, the controller updates the calibration point toward the same direction.

Still optionally, the controller may update the calibration point by using a minimum value of driving amounts of the focus driving system in the correcting operations performed the predetermined number of times.

Still optionally, the telescope main body may include a focus adjusting optical system located on the first optical path.

In a particular case, the focus driving system may move the focus adjusting optical system with respect to the imaging device in a predetermined direction.

In a particular case, the focus detecting system may detect a status in which the image forming position of the object image coincides with the receiving surface by detecting a contrast based on an output signal of the imaging device.

In a particular case, an imaging optical system may be formed by optical components including the objective optical system, the focusing lens and at least one other optical component located between the objective optical system and the receiving surface of the imaging device. In this case, a focal length of the imaging optical system may be not less than 800 mm on the basis of a 35 mm film.

In a particular case, the correction data may include a driving direction and a driving amount of the focus driving system in the correcting operation.

In a particular case, the learning function may be attained by storing the correction data of a plurality of preceding correcting operations and using the stored correction data.

In a particular case, the correction data may be stored in association with identifying data for identifying uniquely each of a plurality of users so that the learning function is performed differently for each of the users.

According to another aspect of the invention, there is provided a spotting scope, which is provided with an ocular optical system, an objective optical system, a focusing system including a focus adjusting member to be manipulated for focusing and a focusing lens which moves along a direction of an optical axis by operation of the focus adjusting member, an imaging device which captures an object image formed through the objective optical system and the focusing lens, and a beam splitter which splits an optical path through the focusing lens into a first optical path directed to the imaging device and a second optical path directed to the ocular optical system.

Further, the spotting scope is provided with a correcting system that performs a correcting operation for correcting a position shift between an image forming position of the object image and a receiving surface of the imaging device caused by diopter variation of a user. The correcting system includes a focus driving system which relatively moves the image forming position of the object image with respect to the receiving surface in the direction of the optical axis, a focus detecting system which detects a status in which the image forming position of the object image coincides with the receiving surface, and a controller which controls the focus driving system. The controller is provided with a learning function of storing correction data of a preceding correcting operation so that the stored correction data of the preceding correcting operation is reflected in a subsequent correction operation.

With this configuration, a focal shift caused by diopter variation of a user, between a visual image viewed through the ocular optical system and the object image captured by the imaging device, is corrected reliably. Even if the diopter of the user changes due to, for example, eye strain or a condition of use of the telescope body (e.g., an illumination condition), the focal shift can be corrected by the learning function.

BRIEF DESCRIPTION OF THE ACCOMPANYING DRAWINGS

DETAILED DESCRIPTION OF THE EMBODIMENTS

Referring to the accompanying drawings, preferable embodiments of a telescope main body and a spotting scope according to the present invention will be described hereunder.

Figure 1:
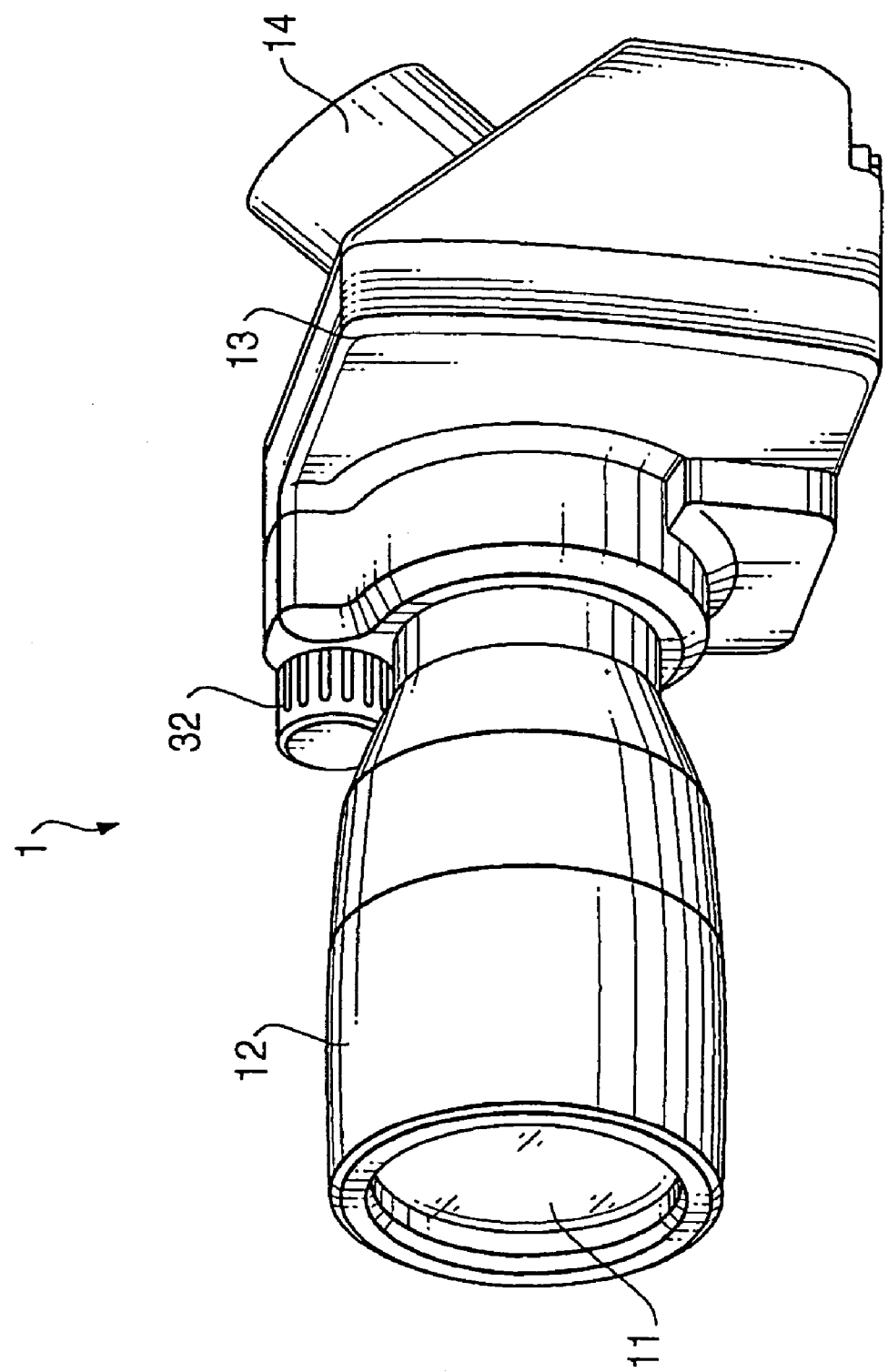
FIG. 1 is a perspective front view showing a telescope main body according to an embodiment of the present invention.
Figure 2:
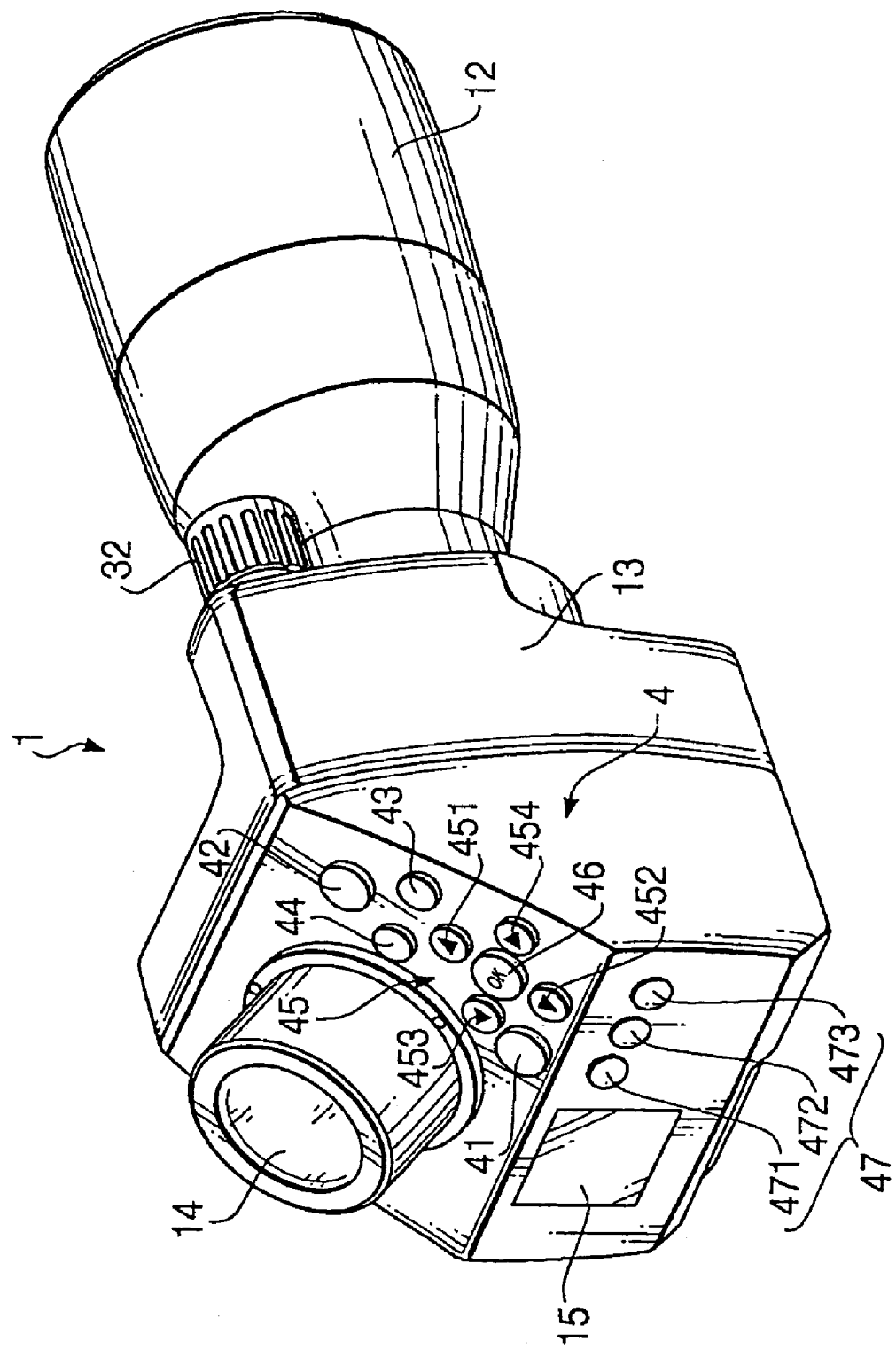
FIG. 2 is a perspective rear view showing the telescope main body of FIG. 1.
Figure 3:
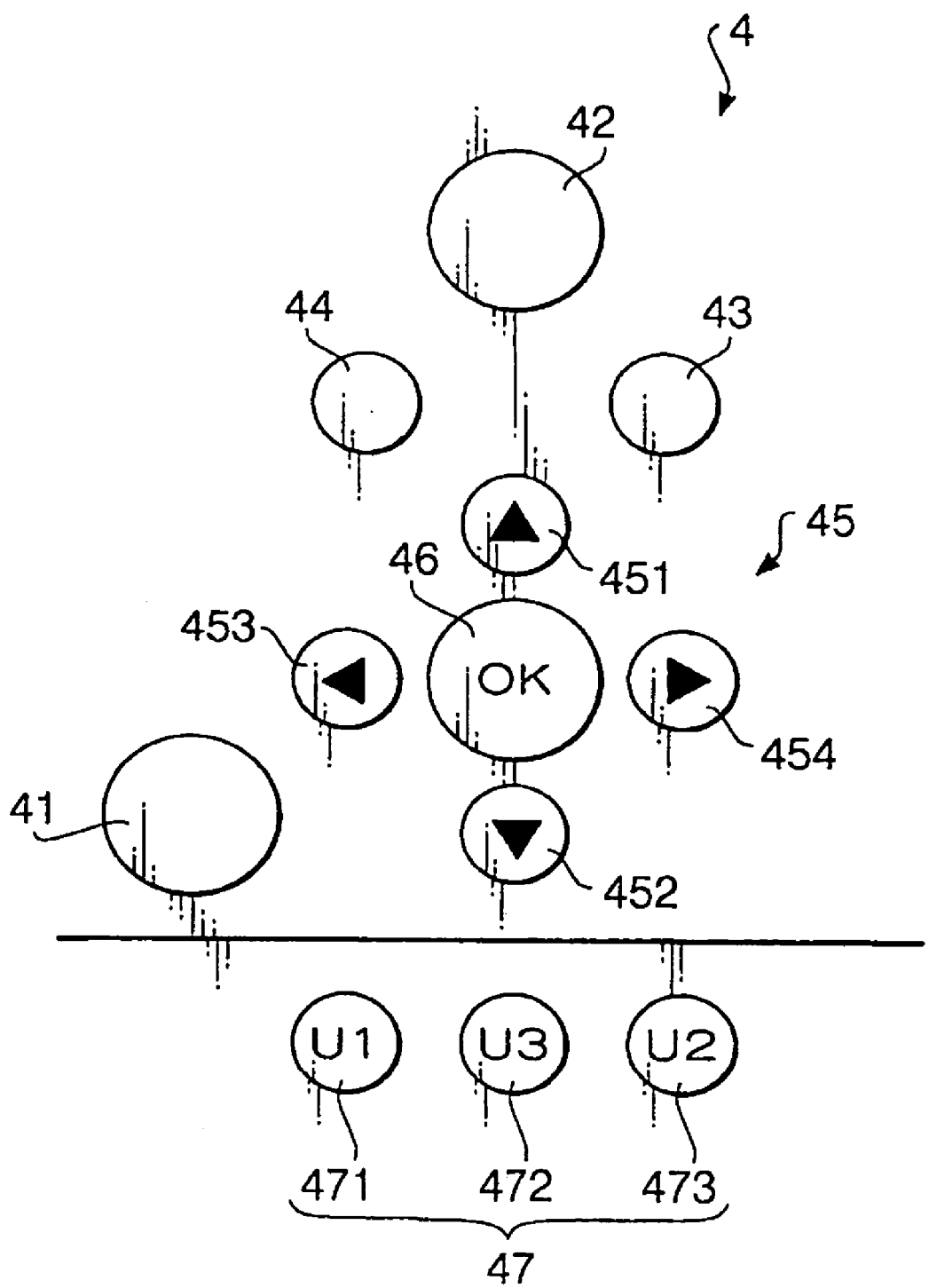
FIG. 3 illustrates a layout of operating buttons of the telescope main body of FIG. 1.
Figure 4:
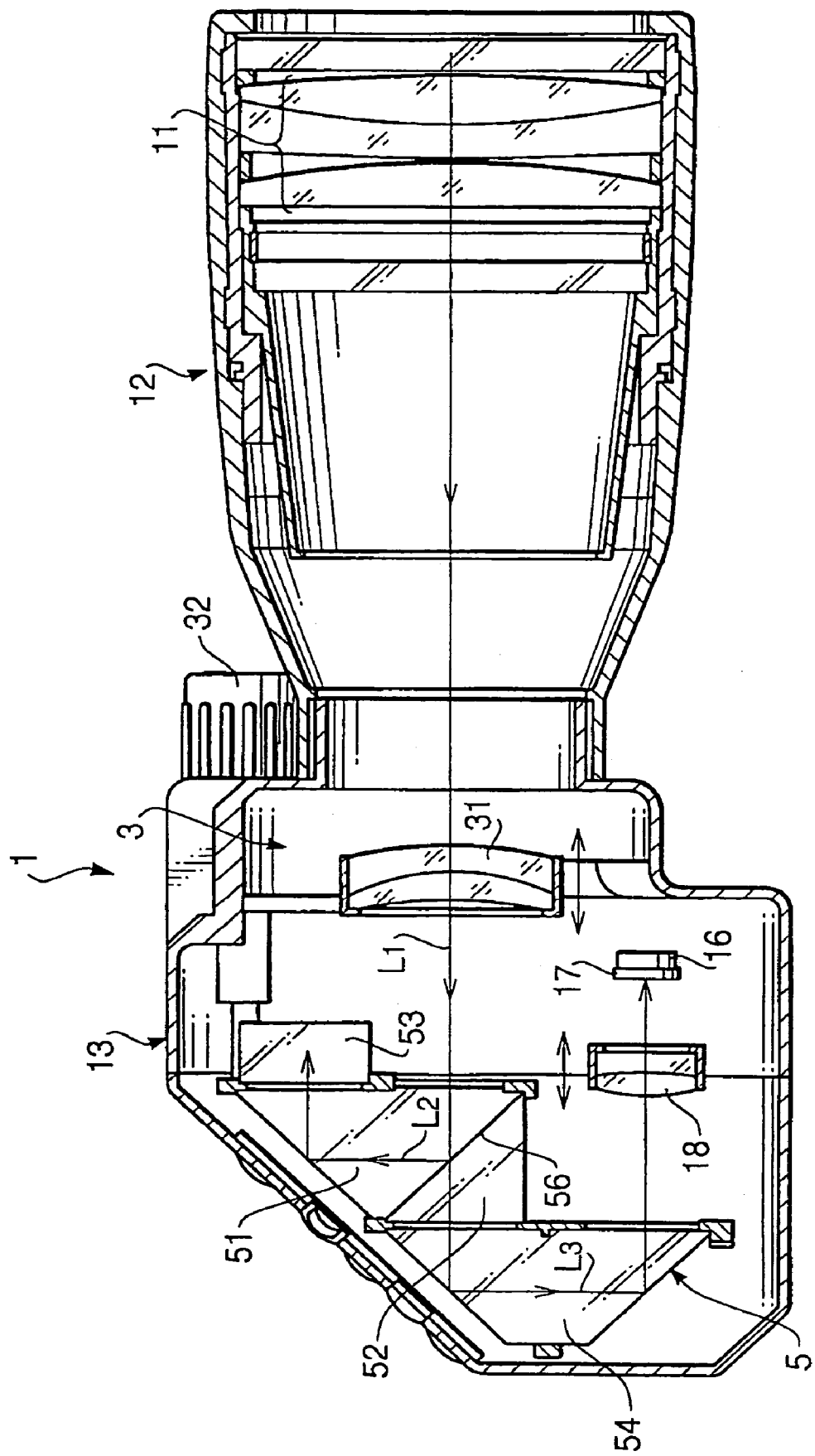
FIG. 4 is a cross-sectional side view showing the telescope main body of FIG. 1.
Figure 5:
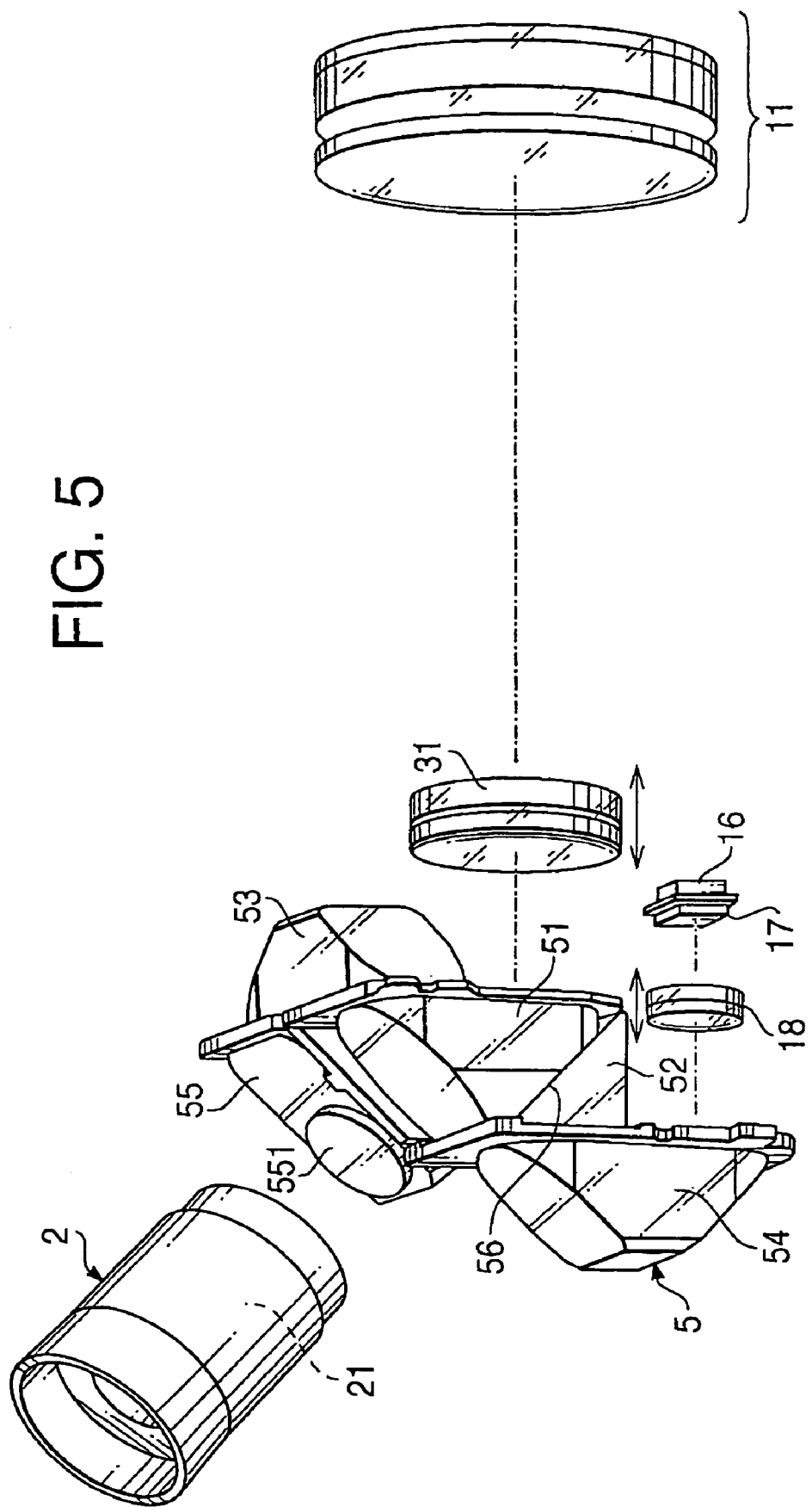
FIG. 5 is a perspective exploded view showing an optical system of a telescope according to the embodiment of the present invention.
Figure 6:
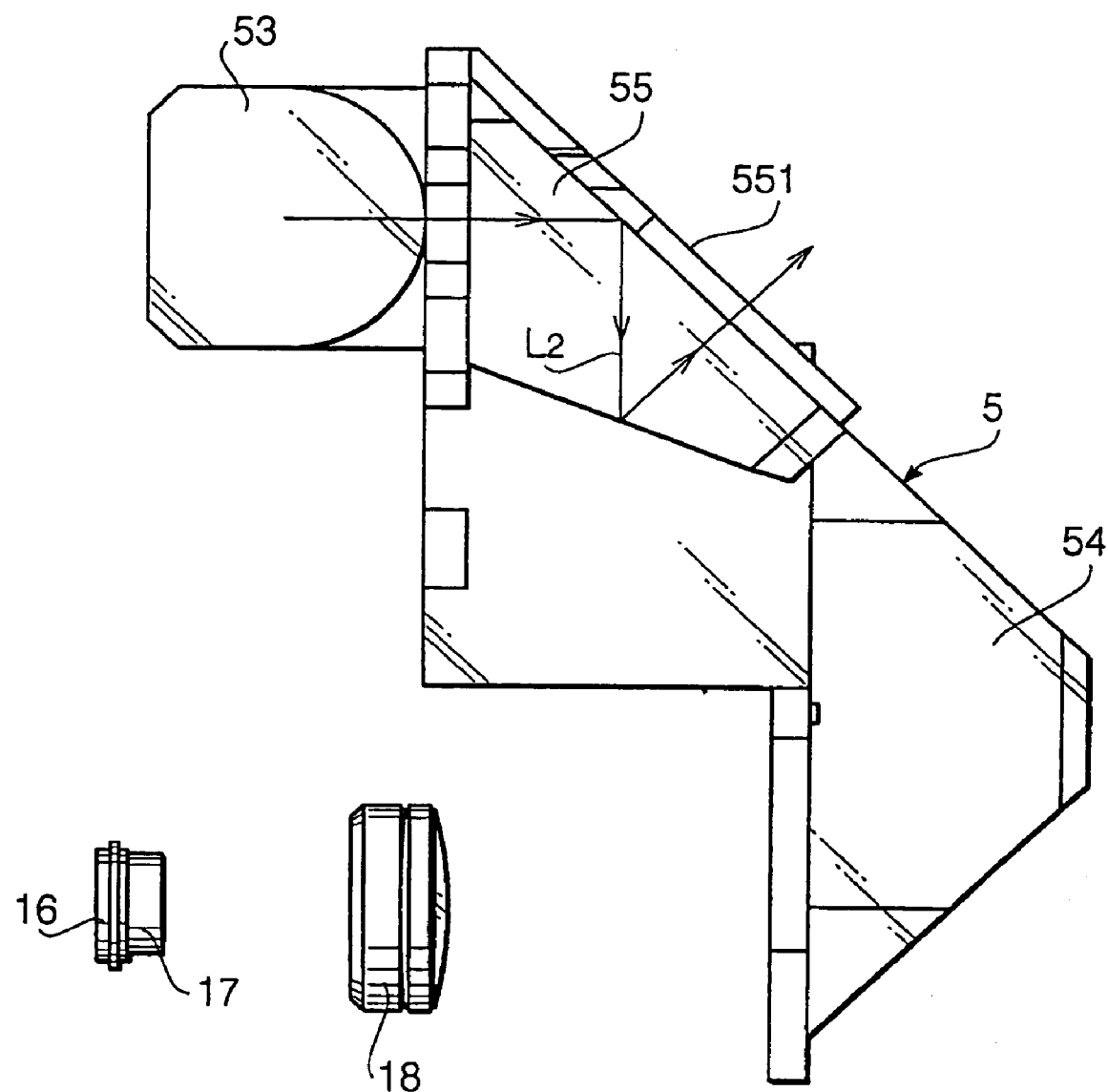
FIG. 6 is a side view showing a prism unit viewed from an opposite side of FIG. 4.
Figure 7:
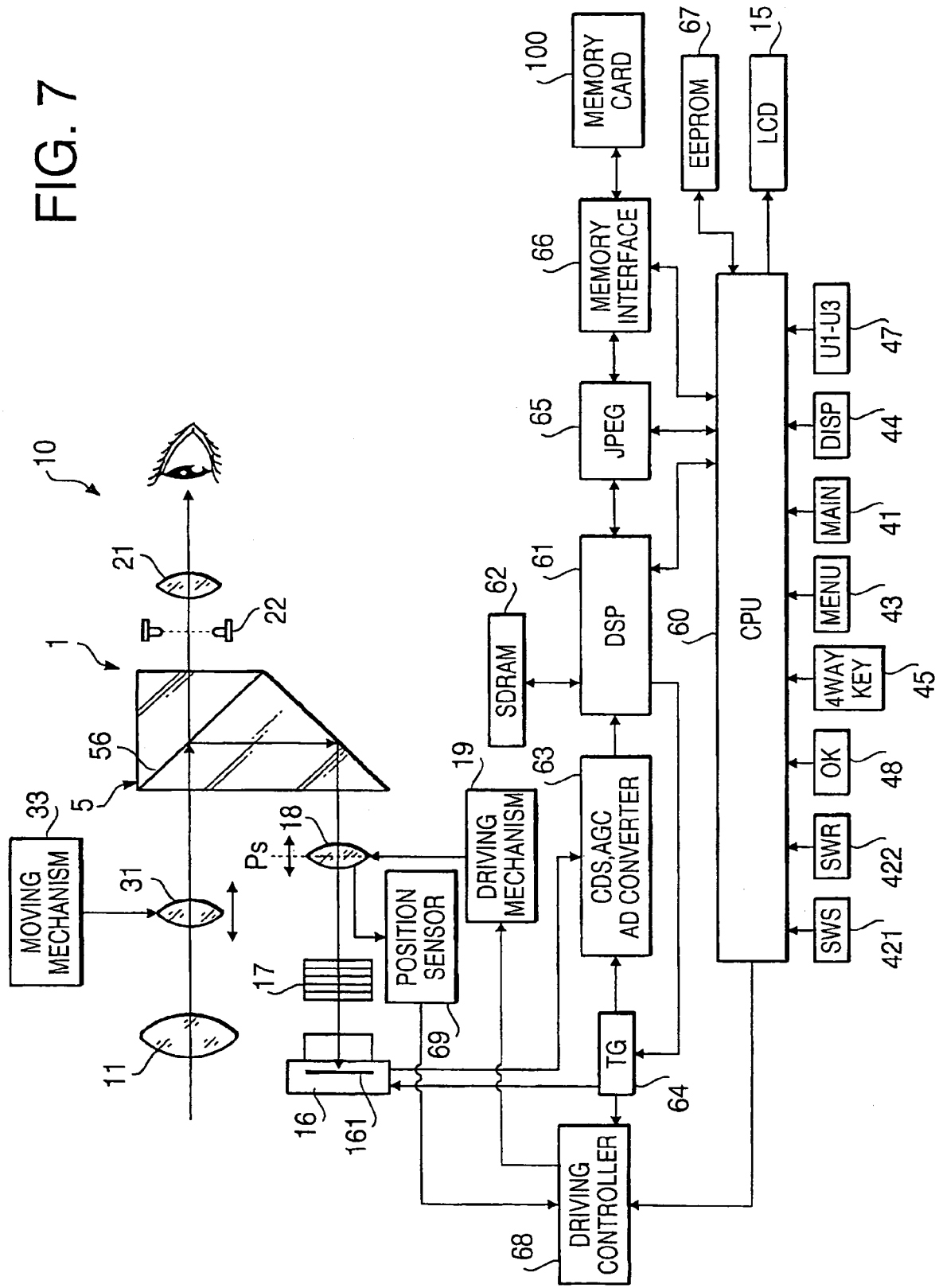
FIG. 7 is a block diagram showing a configuration of the telescope main body of FIG. 1.

FIG. 1 is a perspective front view showing a telescope main body according to an embodiment of the present invention; FIG. 2 is a perspective rear view showing the telescope main body of FIG. 1; FIG. 3 illustrates a layout of operating buttons of the telescope main body of FIG. 1; FIG. 4 is a cross-sectional side view showing the telescope main body of FIG. 1; FIG. 5 is a perspective exploded view showing an optical system of the spotting scope according to the present invention; FIG. 6 is a side view showing a prism unit viewed from an opposite side of FIG. 4; and FIG. 7 is a block diagram showing a configuration of the telescope main body of FIG. 1.

The telescope main body 1 according to the embodiment shown in these drawings is to be combined with an eyepiece 2, to thereby constitute a spotting scope 10. The spotting scope 10 can be suitably utilized for various purposes, typically for bird watching.

As shown in FIG. 1, the telescope main body 1 is provided with a lens barrel 12 containing therein an objective optical system 11 and a casing 13 located at a base portion of the lens barrel 12. The casing 13 is provided with a focusing ring 32 rotatably disposed in an upper region of a front face thereof, for serving as a focus adjusting device.

Referring to FIG. 2, the casing 13 is provided, on a rear face thereof, with an eyepiece mounting base 14 to which the eyepiece 2 can be detachably mounted, a display panel 15 and various operating buttons 4.

On the eyepiece mounting base 14, the eyepiece 2 containing therein an ocular optical system 21 as shown in FIG. 5 can be detachably mounted. Replacing the eyepiece 2 with another having a different focal length can change a magnification of the spotting scope 10. Also, the eyepiece mounting base 14 accepts a variable focus type (zoom type) eyepiece.

While the drawings show an angle type spotting scope in which an optical axis of the eyepiece 2 mounted on the eyepiece mounting base 14 is upwardly inclined with respect to an optical axis of the objective optical system 11 by a predetermined angle, the scope of the present invention is not limited to such type. The present invention may also be applied to a straight type spotting scope in which both the optical axes are parallel to each other.

The display panel 15 is constituted of for example a liquid crystal display device. The display panel 15 can display a menu screen, a setting screen of different modes, an image captured by a CCD (Charge Coupled Device) imaging device 16 to be described later, and so forth.

Referring to FIG. 3, the operating buttons 4 include a main switch 41 for turning on and off the power, a release button 42, a menu key 43, a display key 44 for switching on and off the display panel 15, an up key 451, a down key 452, a left key 453 and a right key 454 respectively for moving a cursor displayed on the display panel 15, and an OK button 46 for entering a selected item.

The operating buttons 4 further include user identification keys 47 by which to identify a user, serving as a user identifying system. The user identification keys 47 include a U1 button 471, a U2 button 472 and a U3 button 473. The telescope main body 1 is provided with a correcting system including a learning function, which corrects a focal shift caused by diopter variation of a user between a visual image viewed through the ocular optical system 21 and an object image captured by the CCD imaging device 16, as will be subsequently described.

The correcting system is configured such that the learning function can store data (concerning the correction of the focal shift) with respect to a plurality of users (3 persons in this embodiment) in correlation with the U1 button 471, the U2 button 472 and the U3 button 473 respectively, so that the three persons can use the telescope main body 1 in common. Accordingly, when one of the three persons uses the telescope main body 1 in a subsequent occasion, the user can read out the stored data simply by pressing a button allocated to him/her among the three buttons of the user identification keys 47.

Referring to FIG. 4, the lens barrel 12 contains the objective optical system 11 in the proximity of a front end portion thereof. Also, a focusing lens (focus adjusting lens) 31 is coaxially placed with respect to the objective optical system 11, in the casing 13. The focusing lens 31 moves along a direction of the optical axis by a manipulation of the focusing ring 32, so as to adjust a focus. A focusing lens moving mechanism 33 (not shown in FIG. 4) for converting a rotational movement of the focusing ring 32 into a rectilinear movement of the focusing lens 31 may be a barrel cam mechanism or a feed screw mechanism etc. The focusing lens 31, the focusing ring 32 and the focusing lens moving mechanism 33 constitute a focusing system 3.

In the casing 13, a prism unit 5 is disposed behind the focusing lens 31. The prism unit 5 includes a first right-angle prism 51, a second right-angle prism 52, a third right-angle prism 53, a fourth right-angle prism 54 and a prism 55.

A short side surface of the first right-angle prism 51 and the long side surface of the second right-angle prism 52 are joined, and the joint plane constitutes a beam splitter 56. Also, as shown in FIG. 5, the prism 55 is provided with an emergence plane 551, through which a light beam proceeds toward the ocular optical system 21 (eyepiece mounting base 14).

Referring further to FIG. 4, a light beam that has passed through the objective optical system 11 and the focusing lens 31 first enters the first right-angleprism 51. An optical path L1 of this light beam is split at the beam splitter 56 into a first optical path L2 directed to the ocular optical system 21 and a second optical path L3 directed to the CCD imaging device 16.

The first optical path L2 directed to the ocular optical system 21 turns its direction by 180 degrees because of reflection at the beam splitter 56 as well as the other short side plane of the first right-angle prism 51. The first optical path L2 is then reflected twice in the third right-angle prism 53 thus to turn its direction again by 180 degrees. Further, as shown in FIG. 6, the first optical path is reflected twice in the prism 55, to thereby upwardly incline and to finally proceed to the ocular optical system 21 through the emergence plane 551.

The first right-angle prism 51 and the third right-angle prism 53 constitute an erecting optical system (porro prism). For this reason an erected image can be observed through the eyepiece 2.

Back to FIG. 4, the second optical path L3 directed to the CCD imaging device 16 passes through the beam splitter 56 to enter the fourth right-angle prism 54, and is reflected twice in the fourth right-angle prism 54 to thereby turn its direction by 180 degrees and to proceed forward.

The casing 13 also accommodates therein the CCD imaging device 16, an optical filter unit 17 and a reducing optical system 18.

The CCD imaging device 16 is disposed at a position appropriate for receiving a light beam that has come along the second optical path L3, to thereby capture an image obtained through the objective optical system 11 and the focusing lens 31. As a result of such configuration, the spotting scope 10 can shoot an electronic image identical to a visual image viewed through the eyepiece 2, with the CCD imaging device 16. It should be noted that another imaging device such as a CMOS sensor or the like may be used in place of the CCD imaging device 16.

The optical filter unit 17 is attached to the CCD imaging device 16 so as to face a receiving plane 161 thereof. The optical filter unit 17 is formed by a lamination of an optical low-pass filter and an infrared cut filter. The optical low-pass filter serves to reduce a spatial frequency component close to a sampling spatial frequency determined by a pixel spacing of the CCD imaging device 16, out of a spatial frequency of a light beam of an object. The optical low-pass filter serves to prevent emergence of a moire, and the infrared cut filter serves to exclude an infrared frequency component. Providing the infrared cut filter permits preventing the CCD imaging device 16 from receiving an Infrared light beam which is invisible to human eyes.

The reducing optical system 18 is placed between the fourth right-angle prism 54 and the combination of the CCD imaging device 16 and the optical filter unit 17. A light beam from the focusing lens 31 that has proceeded along the second optical path L3 is downscaled by the reducing optical system 18 so as to fit a size of the CCD imaging device 16, to thereby form an image on the receiving plane 161 of the CCD imaging device 16.

As described above, the telescope main body 1 is provided with the imaging optical system for the CCD imaging device 16, constituted of the entire optical system disposed between the objective optical system 11 to the receiving plane 161 of the CCD imaging device 16, inclusive of the former, namely the objective optical system 11, the focusing lens 31, the beam splitter 56, the reducing optical system 18 and the optical filter unit 17.

It is preferable that the imaging optical system has a focal length of not less than 800 mm on the basis of a 35 mm film. Here, a focal length on the basis of a 35 mm film means a focal length that forms an object image of a same picture angle on the receiving plane of the CCD imaging device 16, assuming that an effective receiving area of the CCD imaging device 16 is enlarged to the exposure area of a 35 mm silver halide film (36 mm×24 mm).

On the other hand, an upper limit of the focal length of the imaging optical system is not specifically determined, however from the viewpoint of a practical use, a maximum focal length of the imaging optical system of the telescope according to the embodiment of the present invention may be approx. 20000 mm on the basis of a 35 mm film.

The reducing optical system 18 is movably disposed, and is driven by a reducing optical system driving mechanism 19 so as to move in a direction of the optical axis (Ref. FIG. 7). The reducing optical system driving mechanism 19 according to the embodiment includes, though not shown in details, a feed screw and a stepping motor for rotating the feed screw, to thereby rectilinearly drive the reducing optical system 18. Operation of the reducing optical system driving mechanism 19 is controlled by a reducing optical system driving controller 68.

When the reducing optical system 18 moves in a direction of the optical axis, an image forming position of an object image formed through the objective optical system 11 and the focusing lens 31 moves with respect to the receiving plane 161 of the CCD imaging device 16, in a direction of the optical axis. Accordingly, the reducing optical system 18 serves as a focus adjusting optical system for the CCD Imaging device 16, which adjusts a focus of an object image on the receiving plane 161 of the CCD Imaging device 16. Likewise, the reducing optical system driving mechanism 19 serves as a focus driving system which relatively moves the image forming position of the object image with respect to the receiving plane 161 in a direction of the optical axis (i.e., the optical axis of the reducing optical system 18).

Here, the focus driving system according to the embodiment of the present invention may be constituted, without limitation to the above, so as to move the CCD imaging device 16 in a direction of the optical axis, thus to relatively move the image forming position with respect to the receiving plane 161. In this embodiment the reducing optical system 18 is moved for focus adjustment, since such design better simplifies the structure.

The reducing optical system 18 is provided with a position sensor 69 for detecting that the reducing optical system 18 is at a reference position Ps. An output signal of the position sensor 69 is input to the reducing optical system driving controller 68. When the reducing optical system 18 is at the reference position Ps, the receiving plane 161 is located at a position that is optically equivalent to a field frame 22 (target focus position) of the eyepiece 2.

Now referring to FIG. 7, from the viewpoint of electric configuration, the telescope main body 1 is provided with a CPU (Central Processing Unit) 60, a DSP (Digital Signal Processor) 61, an SDRAM (Synchronous Dynamic Random Access Memory) 62, an image signal processor 63, a timing generator 64, a JPEG circuit (image data compressor) 65, a memory interface 66, and an EEPROM (Electrically Erasable Programmable Read-Only Memory) 67. In addition, the casing 13 accommodates therein a slot (not shown) in which a memory card (storage medium) 100 can be loaded.

The CPU 60 serves for integrally controlling the telescope main body 1 based on a preinstalled program and input signals from the operating buttons etc., and performs various controlling operations such as a photographic control, a control over the reducing optical system driving controller 68 and so forth.

The DSP 61 is engaged in driving control of the CCD imaging device 16 and integral control of image processing and storing, including generation of image data based on a pixel signal from the CCD imaging device 16, compression of the image data, storing the image data in the memory card 100, etc., through mutual communication with the CPU 60 for collaboration in these jobs.

The SDRAM 62 includes operating regions for image data generation etc. and regions for the display panel 15 etc., which are determined in advance.

The timing generator 64 is controlled by the DSP 61, to output a sample pulse etc. to the CCD imaging device 16, the image signal processor 63 and the reducing optical system driving controller 68, for controlling an operation thereof.

The spotting scope 10 configured as above is designed such that a visual image viewed through the eyepiece 2 is to be recognized as correctly focused when an image forming position (aerial image) of the visual image has reached a position of the field frame 22 by manipulation of the focusing ring 32, provided that the user's diopter ideally accords with a designed value. In other words, the user is expected to manipulate the focusing ring 32 for focusing purpose such that an image formed at a position of the field frame 22 (target focus position) becomes clearly seen.

As already described, since the receiving plane 161 of the CCD imaging device 16 is at a position optically equivalent to the position of the field frame 22 (target focus position) when the reducing optical system 18 is at the reference position Ps, the same object image is also formed on the receiving plane 161 of the CCD imaging device 16 once the focus is adjusted as above. Therefore, upon shooting the image under such state, a correctly focused picture is supposed to be obtained.

However, a user's diopter is different from one another, and in case of a same user also, his/her diopter varies because of eye strain, or depending on a condition of use (e.g., a illumination condition). Focusing capability of the user's eyes is also an issue. Accordingly, though the user recognizes that a visual image is correctly focused through the eyepiece 2, a position of the visual image formed through the focusing lens 31 may not necessarily accord with a position of the field frame 22, but may shift forward or backward from the position of the field frame 22. Naturally, a position of the object image formed by the imaging optical system also shifts from the receiving plane 161 of the CCD imaging device 16.

In the case where such shift of the image forming position of the object image exceeds a focal depth of the imaging optical system, the image captured by the CCD imaging device 16 suffers a focal shift resulting in a blurred picture, though the user believes that the image is correctly focused when viewed through the eyepiece 2.

In order to prevent such focal shift, the telescope main body 1 has the correcting system which corrects a position shift caused by diopter variation of a user between an image forming position of an object image and the receiving plane 161. The correcting system includes the reducing optical system driving mechanism 19, the reducing optical system driving controller 68, and a focus detecting system which detects a focus on the receiving plane 161.

Meanwhile, in this embodiment the CPU 60 serves as the focus detecting system, and detects a state in which an image forming position coincides with the receiving plane 161 by a contrast detecting method based on an output signal of the CCD imaging device 16.

The correcting system is provided with the learning function of storing a correction amount of preceding correction operation and utilizing that amount for subsequent correction operation, as will be later described. With such function, the telescope main body 1 can securely prevent an image from suffering a focal shift, and it should be underlined that such advantage can be equally achieved despite a temporal variation of a user's diopter or a change of a condition of use.

Hereunder, controlling operations of the spotting scope 10 will be described, including effects and advantages of the correcting system.

Figure 8:
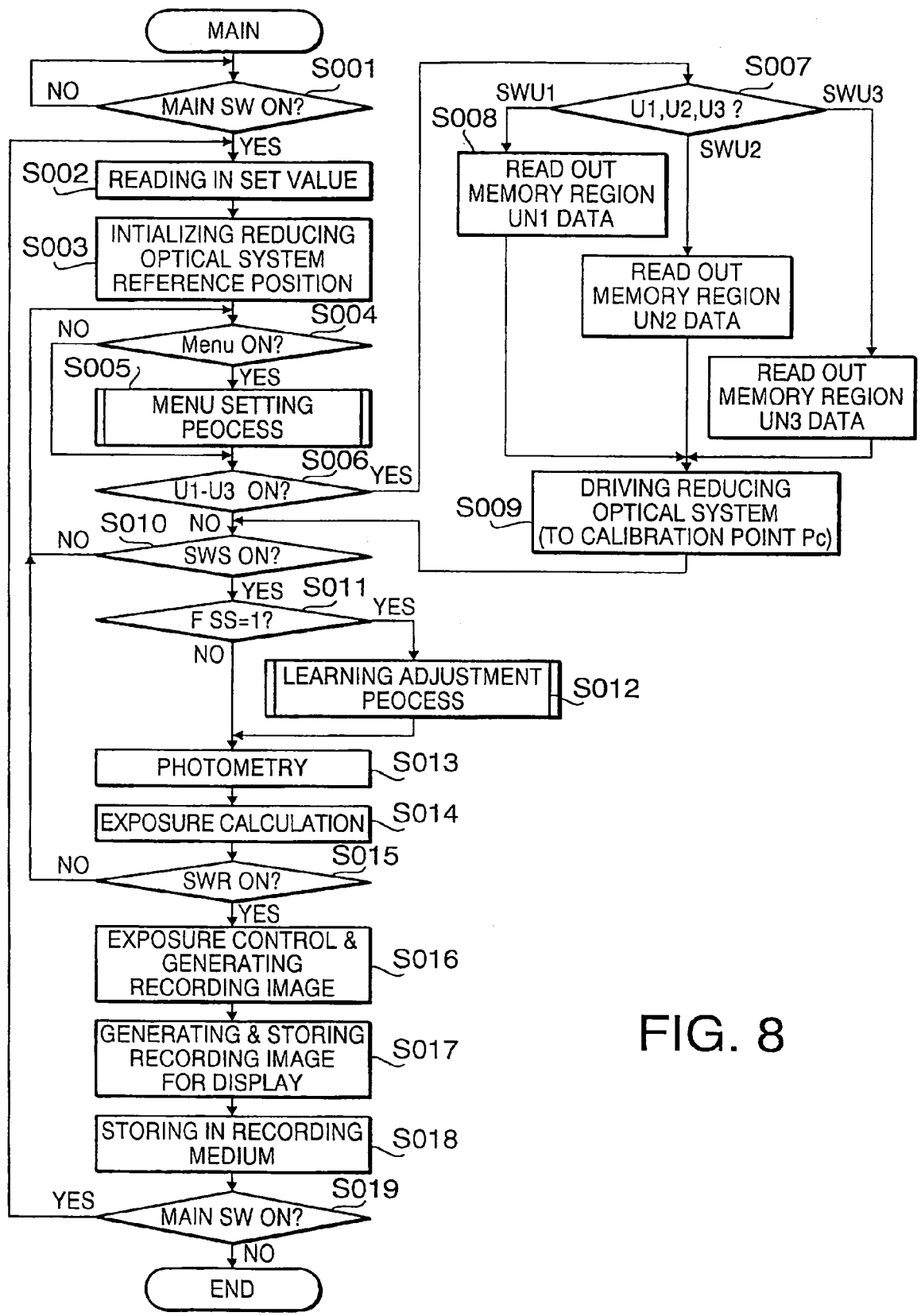
FIG. 8 is a flowchart showing a main controlling operation of the spotting scope according to the embodiment of the present invention.
Figure 9A:
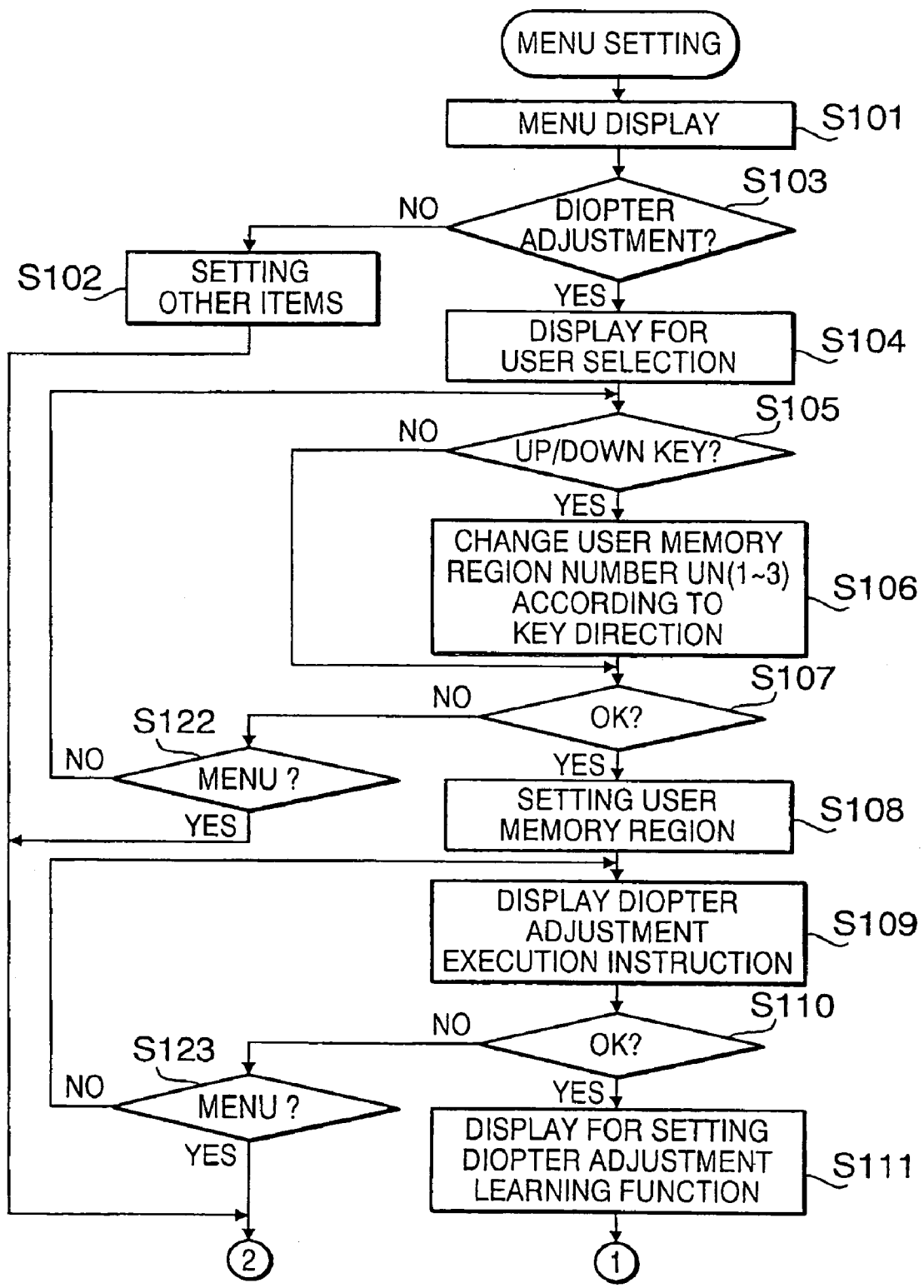
FIGS. 9A and 9B show a flowchart of a menu setting subroutine.
Figure 9B:
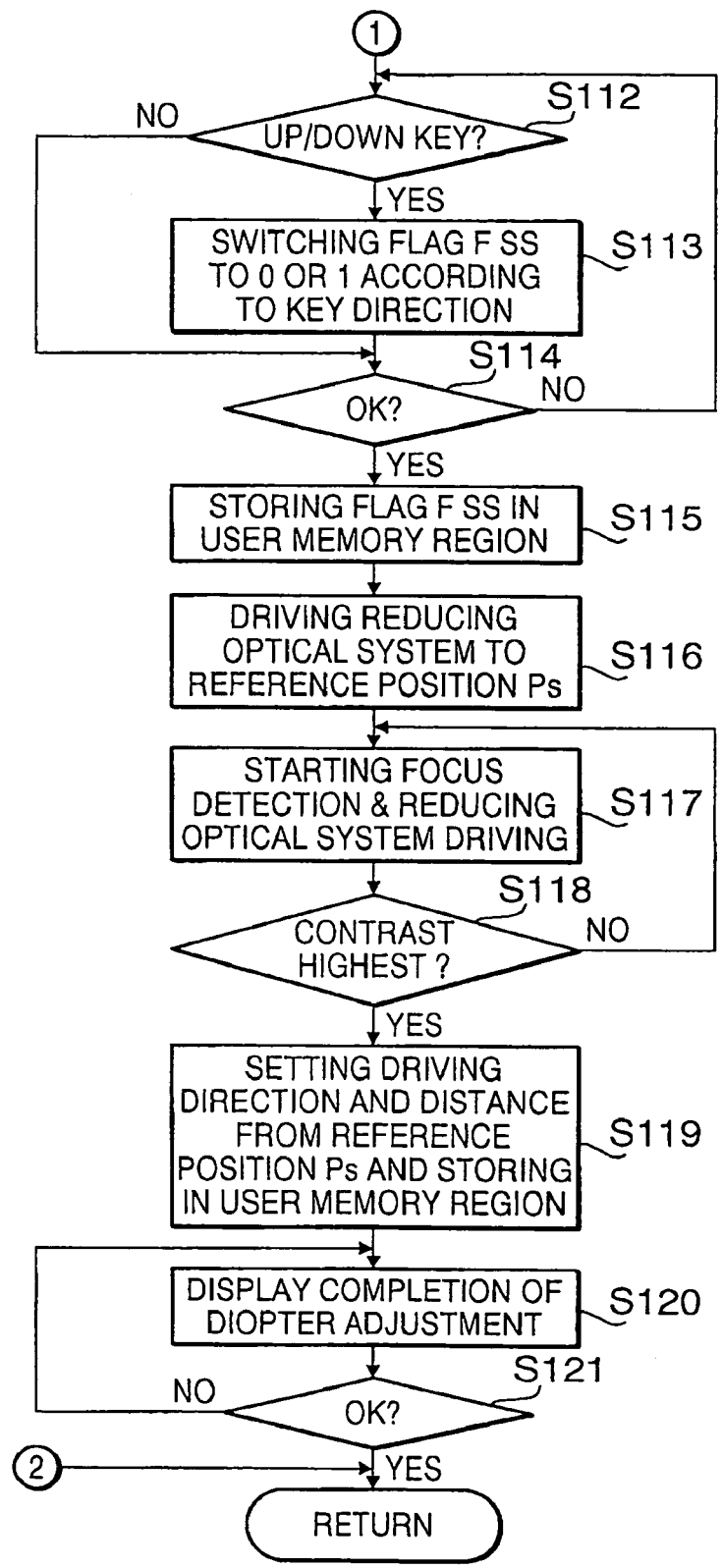
Figure 10:
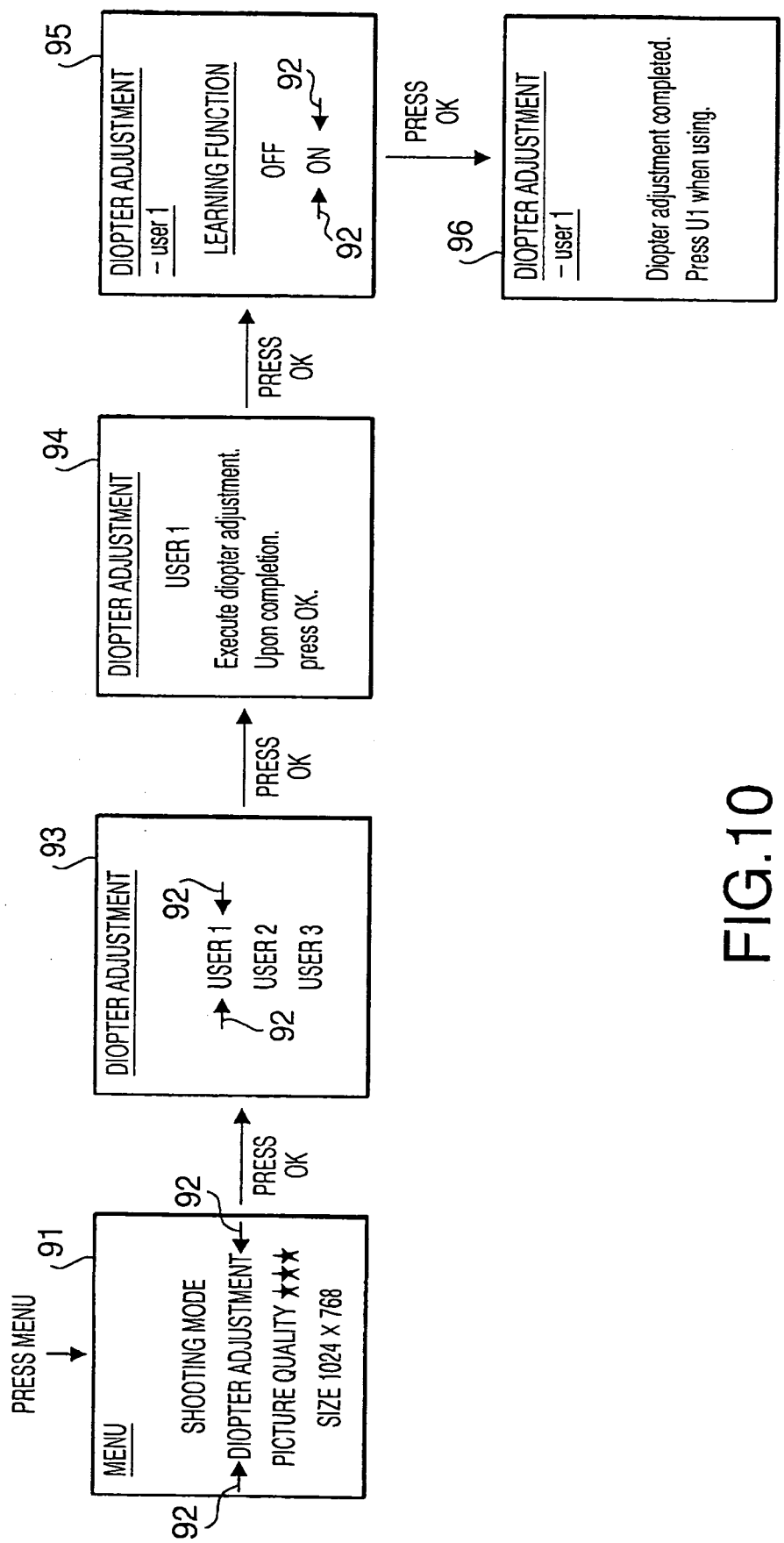
FIG. 10 shows transition of screen displays in the menu setting process.
Figure 11:
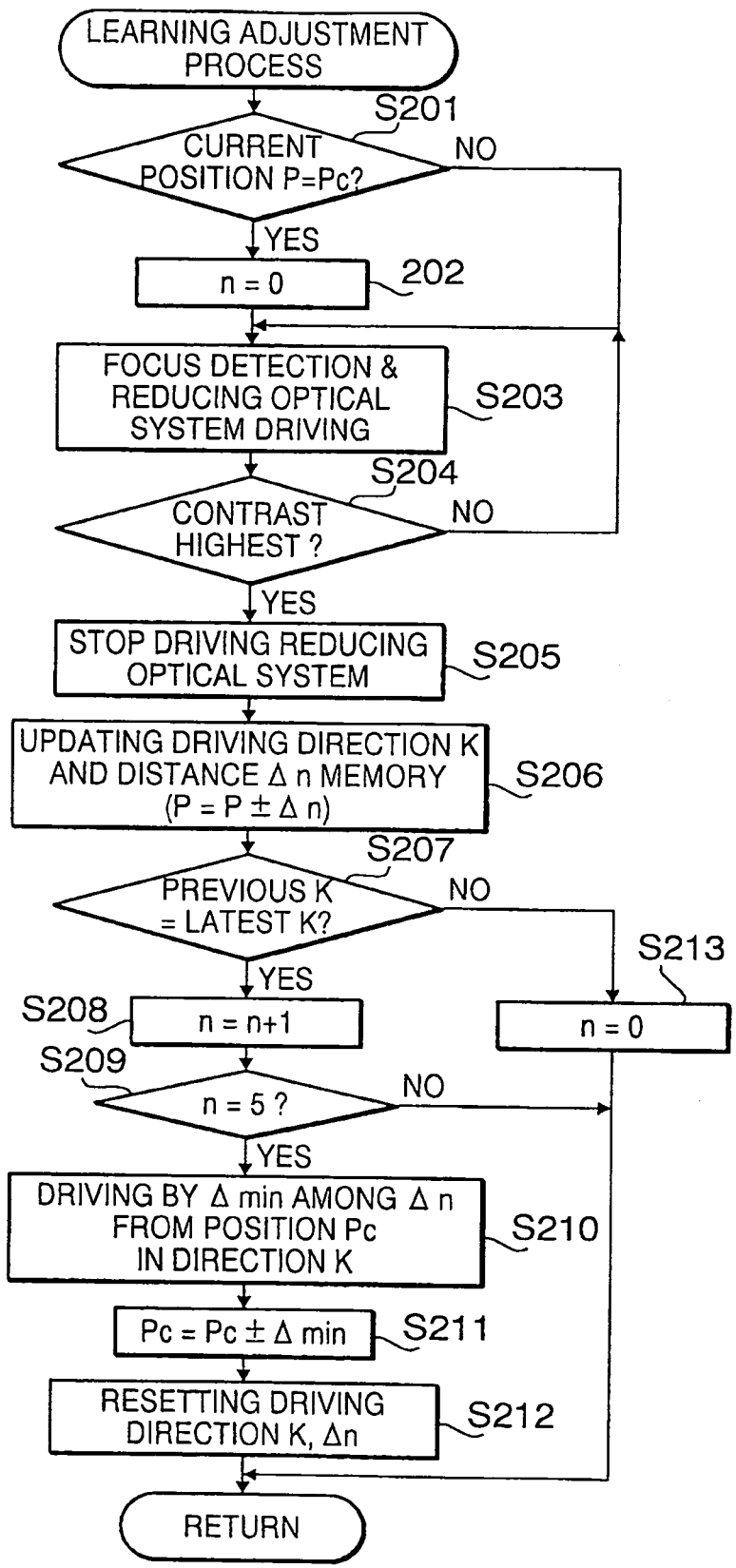
FIG. 11 is a flowchart showing a learning adjustment process subroutine.

FIG. 8 is a flowchart showing a main controlling operation of the spotting scope 10 according to the embodiment; FIGS. 9A and 9B show a flowchart of a menu setting process subroutine; FIG. 10 shows transition of screen displays in the menu setting process; and FIG. 11 is a flowchart showing a learning adjustment process subroutine.

Once the main switch 41 is pressed in an off state to turn the power on (step S001 of FIG. 8), the CPU 60 is activated and reads in various set values (step S002). The CPU 60 then drives the reducing optical system driving mechanism 19 through the reducing optical system driving controller 68, to thereby move the reducing optical system 18 to the reference position Ps (step S003), and performs the initialization.

Here, the CPU 60 controls, upon moving the reducing optical system 18, a driving direction K and a driving distance Δ so as to recognize an absolute position (actual position) of the reducing optical system 18. The driving direction K is defined as plus (+) for a predetermined direction (for example a direction separating from the CCD imaging device 16) and minus (−) for the opposite direction, for controlling purpose. The driving distance Δ can be controlled according to the number of driving pulses provided to a stepping motor of the reducing optical system driving mechanism 19.

Also, the reducing optical system driving mechanism 19 is designed so as to move the reducing optical system 18 by half a length of a focal depth of the imaging optical system, with each input of a driving pulse. For example, in the case where a focal depth of the imaging optical system is 12 μm, the reducing optical system 18 moves 6 μm with an input of a driving pulse to the reducing optical system driving mechanism 19, and two driving pulses are necessary in order to move the reducing optical system 18 over a distance equal to the focal depth.

According to this embodiment, when a user starts using the telescope main body 1 (spotting scope 10), the correcting system performs a calibration (initial correction), by which to calibrate a position shift between an image forming position of an object image and the receiving plane 161. This calibration may hereinafter be referred to as a "diopter adjustment calibration".

When performing the diopter adjustment calibration, the diopter adjustment mode is to be selected. To enter the diopter adjustment mode, firstly the menu key 43 is pressed. Once the menu key 43 is pressed (step S004), the following menu setting process is to be carried out (step S005).

When the menu setting process is started, the CPU 60 controls an on-screen display circuit (not shown) so as to display a main menu screen 91 shown in FIG. 10 on the display panel 15 (step S101 of FIG. 9A). In the main menu screen 91, an item to be set can be selected out of "shooting mode", "diopter adjustment", "picture quality" and "size", by moving the cursor 92 with either the up key 451 or the down key 452. Placing the cursor 92 on one of the letters of "shooting mode", "picture quality" and "size" and pressing the OK button 46 leads to the setting process of the respective modes (S103:No, S102), the description on which, however, will be omitted.

In the main menu screen 91, placing the cursor 92 on the letters of "diopter adjustment" and pressing the OK button 46 (step S103:YES) permits entering the diopter adjustment mode, and a user selecting screen 93 is displayed on the display panel 15 (step S104). In the user selecting screen 93, placing the cursor 92 on one of "user 1", "user 2" and "user 3" and pressing the OK button 46 achieves selection of a user number, which is to be associated with a calibration amount at the diopter adjustment calibration to be subsequently performed and data of learning to be described later.

Manipulating the up key 451 and the down key 452 in the user selecting screen 93 (step S105) causes the cursor 92 to move up and down, by which a user memory region number UN in the EEPROM 67 changes in a range of 1 to 3 (step S106). When the OK button 46 is pressed (step S107:YES), the selected user number is entered. Hereinafter, the case where the "user 1" has been selected will be described.

If it is determined in step S107 that the OK button 46 is not pressed (S107:NO), control proceeds to step S122 to judge whether or not the menu key 43 is pressed. If the menu key 43 is not pressed (S107:NO), control returns to step S105. If the menu key 43 is pressed (S107:YES), the menu setting process is terminated.

When the OK button 46 is pressed after selecting the "user 1", a first user memory region is reserved in the EEPROM 67 under the memory region number of UN=1, for storing a calibration amount and data of learning (step S108), and the display panel 15 displays a diopter adjustment execution instruction screen 94 (step S109).

The diopter adjustment execution instruction screen 94 shows a message to the effect of "Execute diopter adjustment. Upon completion, press OK button", to urge the user to perform the diopter adjustment. Accordingly, the user manipulates the focusing ring 32 to adjust the focus of a visual image viewed through the eyepiece 2.

Once the user finishes the focus adjustment and presses the OK button 46 (step S110:YES), a diopter adjustment learning function setting screen 95 is displayed on the display panel 15 (step S111). Here, simply placing the cursor 92 on either ON or OFF being displayed and pressing the OK button 46 achieves selection of whether or not to utilize the learning function.

If it is determined in step S110 that the OK button 46 is not pressed (S110:NO), control proceeds to step S123 to judge whether the menu key 43 is pressed. If the menu key 43 is not pressed (S123:NO), control returns to step S109. If the menu key 43 is pressed (S123:YES), the menu setting process is terminated.

The CPU 60 receives an input of either the up key 451 or the down key 452 (step S112), and accordingly switches a flag value F_SS between 0 (ON) and 1 (OFF) for administrating the ON/OFF state of the learning function (step S113). Then when the OK button 46 is pressed (step S114:YES), the CPU 60 confirms the flag value F_SS and stores the value in the user memory region (step S115). If the OK button 46 is not pressed (S114:NO), control returns to S112. Hereinafter, the description refers to the case where the learning function is utilized, i.e. the flag value F_SS is 0.

Meanwhile, the telescope main body 1 may have an option of permanently activating the learning function, instead of selecting whether or not to utilize the learning function.

Once the selection of the learning function is completed, the diopter adjustment calibration is started. The CPU 60 drives the reducing optical system driving mechanism 19 through the reducing optical system driving controller 68 to thereby move the reducing optical system 18 to the reference position Ps (step S116), and detects a focus by a contrast detecting method (step S117).

More specifically, the CPU 60 moves the reducing optical system 18 by a minute increment over an entire movement range, and calculates at each step a contrast value based on an image signal provided by the CCD imaging device 16, to thereby identify a position where the contrast is highest i.e. a focusing point, by a known hill climbing method (step S118). If the position having the highest contrast is detected (S118:YES), control proceeds to step S119. The detection of the position having the highest contrast is continued (S118: NO, S117) until the position is detected (S118:YES). Thus positioning the reducing optical system 18 at such focusing point achieves correct focusing of both the visual image viewed through the eyepiece 2 and the object image captured by the CCD imaging device 16.

Then the CPU 60 stores a calibration amount in the foregoing diopter adjustment calibration, defined by a position Pc of the reducing optical system 18 after the calibration, in terms of a driving direction K and a driving distance Δc from the reference position Ps, in the first user memory region in the EEPROM 67 set in the step S108 (step S119). Also, the CPU 60 displays a diopter adjustment completion screen 96 on the display panel 15 to announce to the user that the diopter adjustment calibration has been completed (step S120). Pressing the OK button 46 here finishes the diopter adjustment mode (step S121:YES). If the OK button 46 is not pressed (S121:NO), control returns to step S120.

According to the embodiment, since the telescope main body 1 is configured to allow the user to perform initially the diopter adjustment calibration, a focal shift of an object image can be securely and quickly corrected even in initial several shots for which the learning function has not been effectively activated yet. Also, since the diopter adjustment calibration can be quickly performed through simple procedures as described above, a user-friendly spotting scope free from troublesome manipulations can be provided.

While the foregoing description refers to the case of performing the diopter adjustment calibration with respect to the "user 1" and registering (storing) the position Pc of the reducing optical system 18 after the calibration, the diopter adjustment calibration can equally be performed with respect to the "user 2" and the "user 3". Accordingly, a post-calibration point Pc of the reducing optical system 18 can be registered with respect to up to three persons in this embodiment.

When a user who has finished the diopter adjustment calibration is going to use the spotting scope 10, the user can identify him/herself by pressing a button of the corresponding number among the user identification keys 47 (step S006 of FIG. 8). In the following passages, the case of the "user 1" will be described as a representative example. When the U1 button 471 is pressed (S006:YES, S007:SWU1), the CPU 60 reads out data of the driving direction K and the driving distance Δc stored (memorized) in the first user memory region in the EEPROM 67, and moves the reducing optical system 18 to the calibration point Pc defined by the data.

Thereafter, the "user 1" looks into the eyepiece 2 for viewing an image. At this stage, the user can adjust a focus of the visual image by manipulating the focusing ring 32 according to a distance of the object.

On the display panel 15, a live view (monitor display) of a real-time image captured by the CCD imaging device 16, which is the same as the visual image, is displayed as described in the following process. The object image formed on the receiving plane 161 of the CCD imaging device 16 is photoelectrically converted into electrical charge data, and such charge data (signal) is sequentially read out from the CCD imaging device 16 with a portion corresponding to a predetermined number of pixels thinned out, for reproducing a live view image.

Further, the signal undergoes a correlative double sampling (CDS), automatic gain control (AGC) and analog/digital conversion in the imaging signal processor 63, to then be input to the DSP 61. In the DSP 61, a predetermined signal processing including color processing and gamma correction etc. is performed on the input signal, to thereby generate a live view image data (luminosity signal Y, two color difference signals Cr, Cb).

The live view image data includes a fewer number of pixels (because of the thinning out) than the number of effective pixels of the CCD imaging device 16, in accordance with the number of pixels of the display panel 15, so that the display panel can display an image according to such live view image data. The generation of the live view image data is periodically updated each time the data is read out from the CCD imaging device 16, so that the image is displayed on the display panel 15 as a real-time motion picture.

When the "user 1" encounters a desired visual image during the observation under the above state, he/she can record an electronic image which is identical to the visual image, by pressing the release button 42 to shoot the object.

Here, since the reducing optical system 18 is located at the calibration point Pc because of the diopter adjustment calibration performed earlier, the CCD imaging device 16 is supposed to capture an object image with a correct focus by adjusting the focus of the visual image viewed through the eyepiece 2 regardless of a distance of the object. However, actually, the shot image may suffer a focal shift. This is considered to take place for the following two reasons.

A first reason is based on the fact that a human eye has a focusing function. While the user tries to adjust a focus of a visual image by the focusing ring 32 in the process of the diopter adjustment calibration (step S109), a position of the focusing lens 31 that can make the user feel correctly focused has a certain range, because of the focusing function of his/her eye. Accordingly, though the user believes that the focus has been correctly adjusted, the focusing lens 31 may not be at the correct position. In such a case, the diopter adjustment calibration is performed under an incorrect focus, and the calibration point Pc of the reducing optical system 18 is therefore defined at a position shifted from the correct position, thereby resulting in a focal shift of an image actually shot.

A second reason is based on the fact that the user's diopter may vary with time. In the case where, for example, the user has continued the observation for a long time, his/her diopter varies because of instrument myopia caused by eye strain. Therefore, though the diopter adjustment calibration has been correctly performed and a position of the calibration point Pc has initially been correctly defined, the seemingly correct position of the reducing optical system 18 is shifted from the calibration point Pc because of a temporal variation of the user's diopter, thereby gradually shifting a focus of an image to be shot. It is noted that before the shooting operation (i.e. an operation from step S010), the user manipulates the focusing ring 32 viewing the visual image through the eyepiece 2 so that the visual image is properly focus at the position of the field frame 22.

The embodiment according to the present invention provides a solution for the foregoing problem, by activating the correcting system to perform a correcting operation of correcting a position shift between an image forming position of an object image and the receiving plane 161, and further performing a learning control which includes learning a preceding correcting operation and utilizing that data in a subsequent correcting operation, which permits constantly shooting correctly focused images. Detailed description thereof is given hereunder.

When the release button 42 is pressed halfway down and a photometric switch 421 is thereby turned on (step S010: YES), the CPU 60 checks the flag value F_SS (step S011) and executes the following learning adjustment process in the case where the flag value F_SS is 1 (S011:YES, S012). If it is determine in step S011 that the flag F_SS=0, or the step S012 is finished, control proceeds to step S103.

As shown in FIG. 11, firstly, the CPU 60 decides whether or not an actual position P of the reducing optical system 18 is identical with the calibration point Pc (step S201). In the learning adjustment process, the CPU 60 watches a driving direction K of the reducing optical system driving mechanism 19 at each correcting operation, and counts the number of times that the driving direction K has been consecutively the same, so as to control the number of times of consecutive driving in a same direction under a parameter n, as will be subsequently described.

In the case of P=Pc in the step S201, i.e. when the reducing optical system 18 is at the calibration point Pc (S201:YES), it means that the diopter adjustment calibration has just been performed, and therefore the number of times of consecutive driving in a same direction n is initialized as 0 (step S202). If the actual position P is not the calibration point PC (S201:NO), control proceeds to step S203.

Then the CPU 60 drives the reducing optical system driving mechanism 19 through the reducing optical system driving controller 68 to thereby detect a focus by a contrast detecting method. More specifically, the CPU 60 moves the reducing optical system 18 by a minute increment over a range on both sides (front and rear sides) of the calibration point Pc, and calculates at each step a contrast value based on an image signal provided by the CCD imaging device 16, to thereby identify a position where the contrast is highest, i.e. a focusing point (step S203).

Once the focusing point where the contrast is highest has been detected (S204:YES), the CPU 60 stops the reducing optical system 18 at that position (step S205). The CPU 60 then stores a driving direction K and a driving distance $\Delta n$ from the calibration point PC to the focusing point in the user memory region, and updates a parameter P for controlling an actual position of the reducing optical system 18 by substituting as P=P+$\Delta n$ (when the driving direction K is +) or P=P−$\Delta n$ (step S206).

As a result of performing such correcting operation at the time of starting the photo shooting, even though a calibration shift is produced as above in the diopter adjustment calibration process, which causes a shift of the calibration point Pc from the correct position, a recorrection is carried out such that an image forming position of an object image accurately coincides with the receiving plane 161 of the CCD imaging device 16, thereby assuring correct focusing of an image to be shot.

Also, in the contrast detection in the foregoing correcting operation, since the reducing optical system 18 is located at the calibration point Pc when it starts to be driven, a focusing point can be detected without the need to move the reducing optical system 18 over an extensive range. Accordingly, a driving range (traveling range) of the reducing optical system 18 for contrast detection (step S203) in the correcting operation can be set shorter than a driving range for the contrast detection in the diopter adjustment calibration (step S117), for example just several pulses each on both sides of the calibration point Pc, in terms of the driving pulse for the reducing optical system driving mechanism 19.

As a result, since a focusing position can be quickly detected, a time lag after pressing a release button until the image is actually shot can be shortened, which leads to minimized likelihood of missing a shooting chance. This also contributes in reducing power consumption, thereby resulting in a longer duration of a battery.

When the contrast detection has been completed, a driving direction K of the latest correcting operation and a driving direction K of the previous correcting operation stored in the user memory region are compared (step S207) and in the case where the both directions are the same (S207:YES), 1 is added to the number of times of consecutive driving in a same direction n, as n=n+1 (step S208). Then the CPU 60 decides whether or not the number of times of consecutive driving in a same direction n has reached a predetermined number of times (five times in this embodiment) (step S209). In the case where the number of times of consecutive driving in a same direction n has not yet reached five times (S209:NO), the learning adjustment process is finished.

In the case where the number of times of consecutive driving in a same direction n has reached five times in the step S209 (S209: YES), the calibration point Pc is updated by moving the reducing optical system 18 by a distance equal to a minimum distance $\Delta min$ among the driving distances $\Delta n$ (n=0 to 5) stored in the user memory region, from the calibration point Pc in the same direction as the driving direction K (step S210), and by substituting the calibration point Pc as Pc=Pc+$\Delta min$ (when the driving direction K is +) or as Pc=Pc−$\Delta min$ (step S211).

The foregoing steps S209 to S211 are the essential part of the learning function of the correcting system, which has been conceived based on the following consideration. In the case where the reducing optical system 18 has proved to have been always driven in a same direction each time, as a result of focusing point detection by the contrast detection in the respective preceding correcting operations, it is most probable that the actual calibration point Pc is shifted from the correct position in the same direction.

Accordingly, the CPU 60 is designed to decide that the actual calibration point Pc is shifted from the correct position when the number of times of consecutive driving in a same direction n has reached a predetermined number of times, and to update the calibration point Pc so as to compensate the shift. In addition, according to this embodiment the calibration point Pc is adjusted by a distance equal to a minimum distance $\Delta min$ among the driving distances $\Delta n$, which securely prevents performing an excessive correction that would overpass an actually correct position.

As described above, the correcting system according to the embodiment includes learning a correction amount of preceding correcting operations which have been previously performed, and updating the calibration point Pc of the reducing optical system 18 based on the learned data. As a result, even though a calibration shift is produced in the diopter adjustment calibration, the corresponding calibration point Pc can be automatically corrected, which prevents a shot image from suffering a focal shift more securely. Further, even though a diopter of a user's eye gradually varies owing to eye strain, instrument myopia or a condition of use such as a location of use or ambient brightness has changed, the calibration point Pc can be updated to an actually correct position, thereby securely preventing a shot image from suffering a focal shift.

After having updated the calibration point Pc at the step S211, the stored data of the driving direction K and driving distance Δn (n=0 to 5) is deleted (step S212) in preparation for a subsequent learning control, and then the learning adjustment process is finished.

On the other hand, in the case where a driving direction K in the latest correcting operation has proved to be different, i.e. the opposite direction to a driving direction K of the previous correcting operation in the step S207 (S207:NO), it is to be considered that a tendency of the direction in which the calibration point Pc should be corrected lacks in reliability, therefore the number of times of driving in a same direction n is reset to 0, to thereby finish the learning adjustment process (step S213).

For example, even though a driving direction K in the correcting operation has been consecutively the same from a first to a fourth operations, the number of times of driving in a same direction n is reset if a driving direction K turns over in the next correcting operation. Also, in the case where data from a previous correcting operation is unavailable and hence it is impossible to decide in the step S207, i.e. immediately after a diopter adjustment calibration, the number of times of driving in a same direction n is equally reset to 0, and the learning adjustment process is finished (step S213).

Upon finishing the foregoing learning adjustment process, the CPU60 performs photometry (step S013) and exposure calculation (step S014) based on an output signal from the CCD imaging device 16.

When the release button 42 is pressed all the way down and a release switch 422 is thereby turned on under the above state, (step S015:YES), the CPU 60 instructs the DSP 61 to execute a real exposure. The DSP 61, upon receipt of the instruction of a real exposure, performs unwanted charge discharging control and exposure control (charge storage time control) etc. for the CCD imaging device 16, and then reads out charge data through the imaging signal processor 63 as described earlier, from the CCD imaging device 16 without thinning out the pixels and temporarily stores the data in the SDRAM 62.

Then the DSP 61 carries out a predetermined signal processing with respect to the charge data read out of the SDRAM 62, to thereby generate an original still image data for recording, constituted of the full number of pixels (step S016). If it is determined that the release switch 422 is not turned on (S015:NO), control returns to step S004.

Further, the DSP 61 thins out the pixels from the generated original still image data for recording to generate a screen nail of a still image for displaying (for example 640×480 pixels), and displays the screen nail on the display panel 15 for a predetermined period of time (step S017). The DSP 61 also compresses the generated original still image data for recording in the JPEG circuit 65, and outputs the compressed image data through the memory interface 66, so that the compressed image data is stored in the memory card 100 (step S018). When the main switch 41 is pressed again and thereby the power is turned off (S019:NO), the main controlling operation is terminated. When the main switch is ON (S019:YES), control returns to step S002.

Although the telescope main body and the spotting scope according to the present invention have been described referring to the embodiment shown in the accompanying drawings, it is to be understood that the present invention is not limited to the foregoing embodiment, and that the constituents of the telescope main body and the spotting scope may be optionally substituted with different ones which have an equivalent function. Also, an additional constituent may be optionally incorporated.

Also, the learning function of the correcting system according to the foregoing embodiment is only exemplary, and the learning control may be performed in any other manner, for example working out an average value of the correction amount of a plurality of preceding correcting operations and updating the calibration point Pc based on the average value.

Also, while the foregoing embodiment describes the case where the correcting system is also engaged in the diopter adjustment calibration as an initial correction, in addition to the correcting operation including the learning control, the correcting system may be designed so as to solely perform the correcting operation including the learning control, excluding the diopter adjustment calibration.

Further, while the contrast detecting method is employed as the focus detecting system in the foregoing embodiment, the focus detecting system may be constituted of a different method, for example a phase shift detecting method. Further, while the spotting scope 10 according to the foregoing embodiment is provided with the eyepiece 2 which can be detachably attached to the telescope main body 1 and is hence interchangeable, the eyepiece may be integrally installed on the telescope main body thus to disable an interchange.

Furthermore, the present invention can be applied to various other types of telescopes including an astronomical telescope, without limitation to a spotting scope.

The present disclosure relates to the subject matter contained in Japanese Patent Application No. 2003-377604, filed on Nov. 6, 2003, which is expressly incorporated herein by reference in its entirety.

What is claimed is:

1. A telescope main body, comprising:
    an objective optical system;
    a focusing system including a focus adjusting member to be manipulated for focusing and a focusing lens which moves along a direction of an optical axis by operation of the focus adjusting member;
    an imaging device which captures an object image formed through the objective optical system and the focusing lens;
    a beam splitter which splits an optical path through the focusing lens into a first optical path directed to the imaging device and a second optical path directed to a user's eye; and
    a correcting system that performs a correcting operation for correcting a position shift between an image forming position of the object image and a receiving surface of the imaging device caused by diopter variation of a user, wherein the correcting system includes:
- a focus driving system which relatively moves the image forming position of the object image with respect to the receiving surface in the direction of the optical axis;
- a focus detecting system which detects a status in which the image forming position of the object image coincides with the receiving surface; and
- a controller which controls the focus driving system, the controller being provided with a learning function of storing correction data of a preceding correcting operation so that the stored correction data of the preceding correcting operation is reflected in a subsequent correction operation.

2. The telescope main body according to claim 1, further comprising an ocular optical system located along the second optical path,
wherein the correcting system performs a calibrating operation of detecting a calibration point where the image forming position of the object image coincides with the receiving surface when a user has achieved focusing of a visual image viewed through the ocular optical system by manipulating the focusing ring.

3. The telescope main body according to claim 2, wherein the ocular optical system is provided in an eyepiece which is fixed to the telescope main body.

4. The telescope main body according to claim 2, wherein the ocular optical system is provided in an eyepiece which is detachably attached to the telescope main body.

5. The telescope main body according to claim 2, wherein the calibrating operation is performed at a start of use of the telescope main body.

6. The telescope main body according to claim 2, wherein a driving range of the focus driving system when the focus detecting system detects a focus in the correcting operation includes a region on both sides of the calibration point.

7. The telescope main body according to claim 2, wherein a driving range of the focus driving system when the focus detecting system detects a focus in the correcting operation is smaller than a driving range of the focus driving system when the focus detecting system detects a focus in the calibrating operation.

8. The telescope main body according to claim 2, wherein the controller updates the calibration point based on the correction data obtained through the learning function.

9. The telescope main body according to claim 8,
wherein the correction data includes a driving direction of the focus driving system in the correcting operation, and
wherein when the driving direction of the focus driving system in the correcting operation has been the same over a predetermined number of times, the controller updates the calibration point toward the same direction.

10. The telescope main body according to claim 9,
wherein the controller updates the calibration point by using a minimum value of driving amounts of the focus driving system in the correcting operations performed the predetermined number of times.

11. The telescope main body according to claim 1, further comprising a focus adjusting optical system located on the first optical path.

12. The telescope main body according to claim 11, wherein the focus driving system moves the focus adjusting optical system with respect to the imaging device in a predetermined direction.

13. The telescope main body according to claim 1, wherein the focus detecting system detects a status in which the image forming position of the object image coincides with the receiving surface by detecting a contrast based on an output signal of the imaging device.

14. The telescope main body according to claim 1,
wherein an imaging optical system is formed by optical components including the objective optical system, the focusing lens and at least one other optical component located between the objective optical system and the receiving surface of the imaging device, and
wherein a focal length of the imaging optical system is not less than 800 mm on the basis of a 35 mm film.

15. The telescope main body according to claim 1, wherein the correction data includes a driving direction and a driving amount of the focus driving system in the correcting operation.

16. The telescope main body according to claim 1, wherein the learning function is attained by storing the correction data of a plurality of preceding correcting operations and using the stored correction data.

17. The telescope main body according to claim 1, wherein the correction data is stored in association with identifying data for identifying uniquely each of a plurality of users so that the learning function is performed differently for each of the users.

18. A spotting scope, comprising:
an ocular optical system;
an objective optical system;
a focusing system including a focus adjusting member to be manipulated for focusing and a focusing lens which moves along a direction of an optical axis by operation of the focus adjusting member;
an imaging device which captures an object image formed through the objective optical system and the focusing lens;
a beam splitter which splits an optical path through the focusing lens into a first optical path directed to the imaging device and a second optical path directed to the ocular optical system; and
a correcting system that performs a correcting operation for correcting a position shift between an image forming position of the object image and a receiving surface of the imaging device caused by diopter variation of a user,
wherein the correcting system includes:
a focus driving system which relatively moves the image forming position of the object image with respect to the receiving surface in the direction of the optical axis;
a focus detecting system which detects a status in which the image forming position of the object image coincides with the receiving surface; and
a controller which controls the focus driving system, the controller being provided with a learning function of storing correction data of a preceding correcting operation so that the stored correction data of the preceding correcting operation is reflected in a subsequent correction operation.

\* \* \* \* \*